Sept. 26, 1967  E. C. MAURER  3,343,622
SEAT BELT SWITCH
Filed June 21, 1965
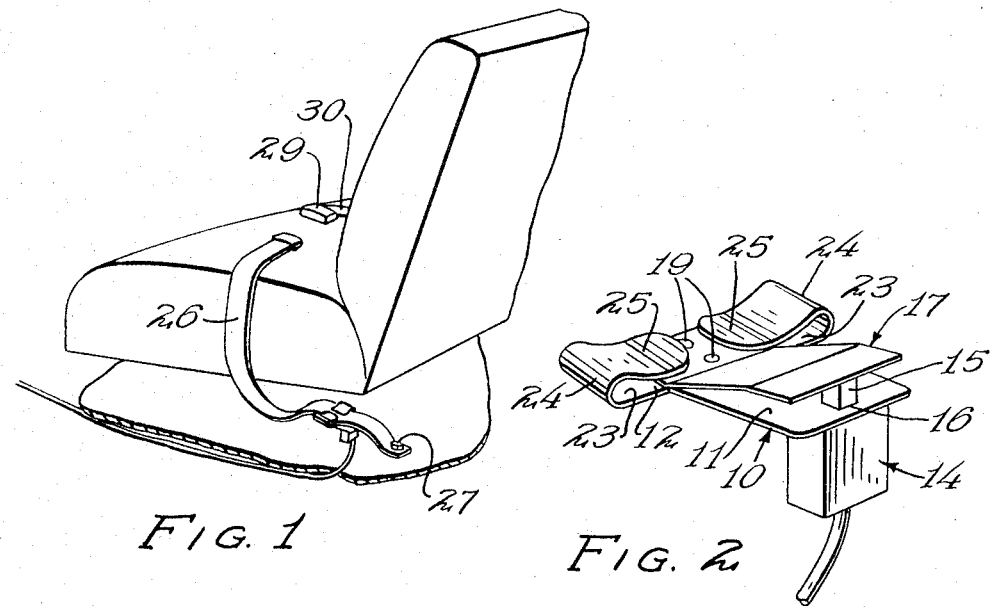
Fig. 1  Fig. 2
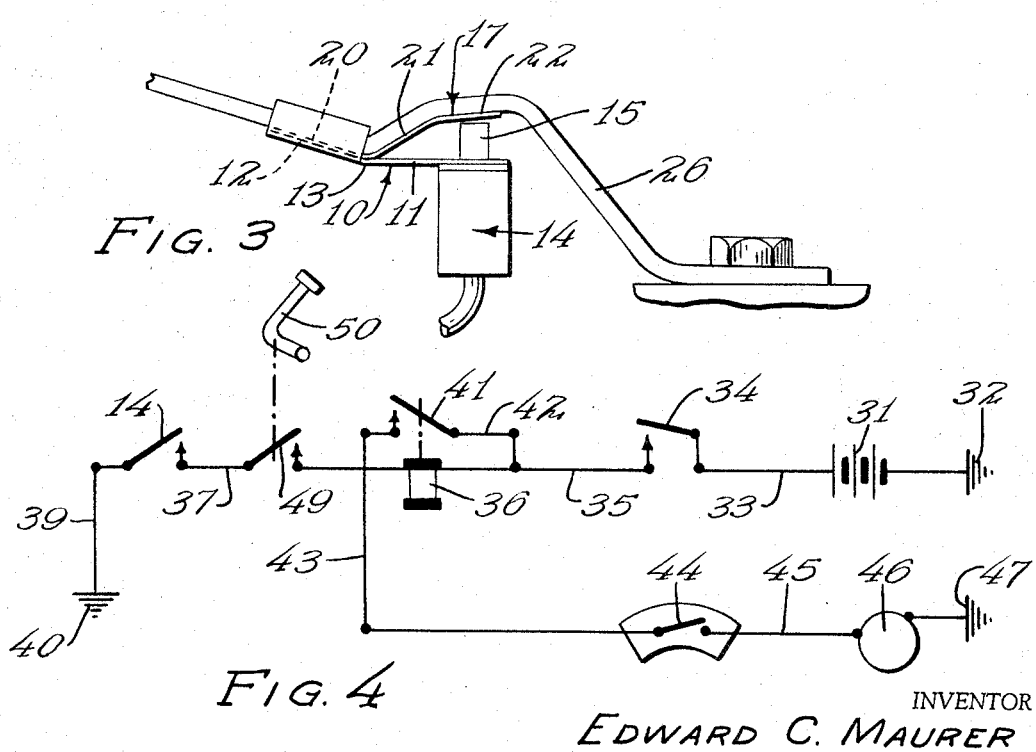
Fig. 3
Fig. 4
INVENTOR
EDWARD C. MAURER

United States Patent Office 3,343,622
Patented Sept. 26, 1967

3,343,622
SEAT BELT SWITCH
Edward C. Maurer, 746 E. 7th St.,
St. Paul, Minn. 55106
Filed June 21, 1965, Ser. No. 465,281
7 Claims. (Cl. 180—82)

This invention relates to an improvement in a seat belt switch and deals particularly with a switch which is supported by a seat belt and which is actuated by tension upon the belt.

During recent years the use of seat belts in passenger vehicles has greatly increased and in some states is mandatory. While it has been shown that the use of seat belts considerably increases the passengers' chance of survival in the event of a serious accident, many folks disregard them and do not take the trouble to fasten them. As a result, various means have been provided for providing an indication when the seat belt is not in use. For example, means have been provided to prevent the starting of the vehicle motor unless the seat belt is fastened. In other cases, a warning signal is sounded when the car is operated while the seat belt remains unfastened. Devices of this type also usually employ a switch of some type used in conjunction with the seat belt.

The object of the present invention resides in providing a seat belt switch of the type described which is very inexpensive to produce and effective in operation.

A feature of the present invention resides in the provision of a switch which comprises a plate which is transversely bent intermediate its ends to provide a concave side and a convex side. A switch is mounted on the plate on the convex side thereof at one end, and includes a switch actuating plunger which extends through the plate. A spring is secured to the concave surface of the other end of the plate and overlies the plunger. Means is provided for holding a portion of the belt in contact with said other end of said plate overlying the concave side of the plate and the spring. The spring normally kinks the belt and the normally open switch remains open when there is no tension upon the belt. When tension is applied to the belt, the tension tends to straighten the belt, flexing the spring against the switch plunger and actuating the switch.

These and other objects and novel features of the present invention will be more clearly and fully set forth in the following specification and claims:

In the drawings forming a part of the specification.
FIGURE 1 is a diagrammatic view indicating the switch mounted upon a seat belt.
FIGURE 2 is a perspective view of the switch detached from the belt.
FIGURE 3 is an elevational view showing the switch attached to the belt.
FIGURE 4 is a wiring diagram showing a typical method of using the switch.

One of the advantages of the present structure lies in its simplicity. Because of the fact that the device is extremely simple, it may be produced at a very low cost. At the same time, the device functions very effectively for its intended purpose.

The device includes a bracket which is indicated in general by the numeral 10. The bracket includes a plate of sheet metal or similar material having a switch mounting end 11 and a belt attaching end 12. The plate is bent along a transverse line 13 so that one surface of the plate is slightly concave and the other surface thereof is slightly convex.

A switch housing 14 is secured overlying the convex surface of the plate 10 at the switch attaching end of the plate. The switch 14 may comprise what is known as a plunger switch, the contacts of which are normally open. A plunger 15 is provided by means of which the switch contacts may be closed. The plunger 15 extends through an aperture 16 in the plate end 11, the end of the plunger 15 terminating in spaced relation to the concave surface of the plate.

A leaf spring 17 is secured to the concave surface of the seat belt attachment end 12 of the plate or bracket 10 by means of rivets 19 or other such means. The spring 17 includes an anchored end portion 20 which is in face contact with the belt attaching end 12 of the plate 10, a diverging portion 21 which diverges away from the switch attachment end 11 of the bracket 10 and a reversely bent end portion 22 which overlies the end of the plunger 15. The flexing of the end 22 of the spring 17 toward the bracket end 11 will act to depress the plunger 15 and close the switch contacts of the switch 14.

The end 12 of the bracket plate 10 is provided with a pair of laterally extending arms 23 which are reversely bent at 24 to provide seat belt engaging members 25 which overlie the end portion 12 of the bracket. These seat belt engaging members 25 terminate in spaced relation and the arms are sufficiently resilient to hold a portion of the seat belt 26 in face contact with the bracket end 12 or, more properly, with the end portion 20 of the spring blade 17 which overlies the concave surface of the bracket. The arrangement is such that when the belt is not under tension, the spring 17 will flex or kink the belt as indicated in FIGURE 3 of the drawings without depressing the switch plunger 15. However, as soon as a slight tension is applied to the seat belt 26, the seat belt will tend to straighten out, pressing the end 22 of the spring 17 against the switch actuating plunger 15, and actuating this switch.

As indicated in FIGURE 1, one end of the seat belt 26 is anchored to the body of the vehicle by means of a bolt 27 or other suitable means. A suitable seat belt fastening means 29 is secured to one end of the two-part seat belt, the other end of the belt being indicated at 30 and being anchored to the vehicle in any desired manner, not illustrated in the drawings.

A typical circuit which may be used in conjunction with the switch is indicated in FIGURE 4. The vehicle battery 31 is grounded as indicated at 32. The other terminal of the battery is connected by a conductor 33 to the ignition switch 34, the other terminal of which is connected by a conductor 35 to one terminal of a relay coil 36. The other terminal of the relay coil 36 is connected by a conductor 37 to the normally open seat belt switch 14 which has been described. The other terminal of the switch 14 is connected by conductor 39 to ground as indicated at 40. Thus, when both the starter switch 34 and belt switch 14 are closed, a circuit is closed to the relay coil 36.

The relay armature 41 is connected to the ignition switch conductor 35 by a conductor 42. The other terminal of the relay switch 41 is connected by a conductor 43 to a switch 44 which is closed when the gear shift lever is in neutral or in predetermined desired position. When the switch 44 is closed, it is connected by a conductor 45 to the starter 46, the other terminal of which is grounded as indicated at 47.

It should be explained that the ignition switch 34 comprises that portion of the ignition switch which is normally closed to actuate the starter. Thus, the present circuit is designed only to prevent the starting of the vehicle engine unless the seat belt is fastened. Once the engine is started, the switch 34 opened, making it possible for the seat belt to be unbuckled without turning off the ignition. However, this arrangement has the advantage of preventing the sudden opening of the ignition switch accidentally while the vehicle is in motion. Once the seat belt is fastened, it will usually remain fastened during a trip, and the present circuit requires that the seat belt be fastened before the engine may be started.

Also included in the starter circuit may be a switch 49 which is normally open. The switch 49 is closed by the emergency brake 50, diagrammatically shown in FIGURE 4. When the switch 49 is arranged in series with the seat belt switch 14 and relay coil 36, the relay cannot be operated to start the engine unless the emergency brake is set.

In accordance with the patent statutes, I have described the principles of construction and operation of my improvement in seat belt switch, and while I have endeavored to set forth the best embodiment thereof, I desire to have it understood that changes may be made within the scope of the following claims without departing from the spirit of my invention.

I claim:
1. A switch for use in combination with a seat belt and including:
    a mounting bracket including a plate bent along a line intermediate its ends to provide a concave side and a convex side,
    a pair of opposed belt engaging members extending to opposite sides of one of said ends of the plate and overlying portions of said one end on the concave side of said bracket and adapted to hold a portion of the belt in face contact with said portions of said one end of the plate,
    a switch housing secured to the other end of said plate on the convex side of said bracket,
    a switch within said housing and including a switch actuating plunger extending through said other end of said plate,
    a spring plate secured to said one end of said plate overlying the concave side of the bracket and having an angularly bent end extending over said plunger and engageable therewith,
    said spring plate being adapted to kink a belt extending over the concave side of the bracket.
2. The structure of claim 1 and in which the switch is a normally open switch.
3. A seat belt attachment in combination with vehicle having a motor, a starter circuit including a starter, a starter switch, a battery connected in said circuit, and a seat belt, the attachment including,
    a normally open switch,
    a bracket connecting said switch to said belt,
    said bracket including a plate bent intermediate its ends to provide a concave side and a convex side,
    said switch being mounted on one end of the convex side of said plate and having a switch actuating plunger extending through said one plate end,
    a spring anchored to the other end of the concave surface of said plate and overlying said plunger, and
    said bracket including means engageable with said belt to hold a portion thereof against said other end of the plate end to overlie said spring whereby tension on said belt will flex said spring and actuate said plunger to close said switch,
    a relay including normally open contacts in said starter circuit, and
    a second circuit including the coil of said relay, said normally open switch, and said battery.
4. The structure of claim 3 and including a normally open emergency brake switch in said second circuit, this switch being closed when said emergensy brake is set.
5. A switch unit for use in combination with a seat belt to be applied around a driver of a motor vehicle, said switch unit comprising: a mounting member, belt engaging means on said mounting member for holding the mounting member upon a portion of the seat belt adjacent to a flexible portion thereof, switch means on the mounting member, said switch means including a switch actuating member, a flexible resilient member on said mounting member, said resilient member having an angularly bent end over which said flexible portion of the seat belt extends to form a kink therein and which resilient member is flexed when said portion of the seat belt is placed under a given tension indicating that the seat belt is applied around the driver of the vehicle, said tension tending to straighten the kinked portion of the seat belt, and said switch actuating member being in a position adjacent the flexed portion of the resilient member which actuates the switch means when said seat belt is under said given tension.
6. The switch unit of claim 5 in combination with a vehicle including a vehicle driver's seat, a battery, and a starter switch manually actuable by the driver sitting in said driver's seat, a seat belt for said driver's seat to which belt said switch unit is attached to provide said kink in the flexible portion thereof, said vehicle having a motor starter circuit including motor means, said switch unit and starter switch, and means responsive to the concurrent actuation of said starter switch and said switch means for connecting said battery to said motor to energize the same.
7. The switch of claim 6 wherein said belt engaging means on said mounting member attaches the entire switch unit to said flexible portion of the seat belt, which thereby carries the switch unit.

References Cited

UNITED STATES PATENTS

| | | | |
|---|---|---|---|
| 1,641,658 | 9/1927 | Berglund | 220—61.18 |
| 2,574,688 | 11/1951 | Camras | 220—61.14 |
| 3,133,277 | 5/1924 | Hood | 180—82 |
| 3,185,246 | 5/1965 | Maurer | 180—82 |
| 3,226,674 | 12/1965 | Ericksson | 340—53 |
| 3,230,009 | 1/1966 | Schmidt et al. | 297—388 |
| 3,266,842 | 8/1966 | Board et al. | 180—82 |

KENNETH H. BETTS, *Primary Examiner.*